US012704971B2

(12) United States Patent
Heath

(10) Patent No.: US 12,704,971 B2
(45) Date of Patent: Aug. 11, 2026

(54) FORECASTED TEMPERATURE BASED MEDIA MANAGEMENT

(71) Applicant: Micron Technology, Inc., Boise, ID (US)

(72) Inventor: Nicholas T. Heath, Pittsboro, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/434,219

(22) Filed: Feb. 6, 2024

(65) Prior Publication Data

US 2024/0272807 A1 Aug. 15, 2024

Related U.S. Application Data

(60) Provisional application No. 63/444,457, filed on Feb. 9, 2023.

(51) Int. Cl.
*G06F 3/06* (2006.01)

(52) U.S. Cl.
CPC .......... *G06F 3/0619* (2013.01); *G06F 3/0659* (2013.01); *G06F 3/067* (2013.01)

(58) Field of Classification Search
None
See application file for complete search history.

(56) References Cited

U.S. PATENT DOCUMENTS

2011/0231697 A1 9/2011 Berke et al.
2016/0117216 A1 4/2016 Muchherla et al.
2016/0162219 A1* 6/2016 Erez ......................... G11C 7/04 711/103
2019/0018713 A1 1/2019 Foxworth et al.
2022/0405181 A1 12/2022 Xu et al.
2024/0272807 A1* 8/2024 Heath .................. G06F 3/0679

FOREIGN PATENT DOCUMENTS

WO 2024167921 8/2024

OTHER PUBLICATIONS

"International Application Serial No. PCT US2024 014618, International Search Report mailed May 31, 2024", 3 pgs.
"International Application Serial No. PCT US2024 014618, Written Opinion mailed May 31, 2024", 3 pgs.

* cited by examiner

*Primary Examiner* — Brian R Peugh
(74) *Attorney, Agent, or Firm* — Schwegman Lundberg & Woessner, P.A.

(57) ABSTRACT

Aspects of the present disclosure configure a system component, such as a memory sub-system controller, to provide adaptive media management based on forecasted temperatures. The controller determines, at a current time, a first temperature of an environment associated with a host of a memory sub-system. The controller forecasts, at the current time, a second temperature that the host will be exposed to at a future time and computes, at the current time, a temperature range based on a difference between the first temperature and the second temperature. The controller selects, for an individual group of memory components, an individual media management operation from a plurality of media management operations based on the computed temperature range and performs the individual media management operation on the individual group of memory components.

20 Claims, 5 Drawing Sheets

FORECASTED TEMPERATURE BASED MEDIA MANAGEMENT

PRIORITY APPLICATION

This application claims the benefit of priority to U.S. Provisional Application Ser. No. 63/444,457, filed Feb. 9, 2023, which is incorporated herein by reference in its entirety.

TECHNICAL FIELD

Embodiments of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
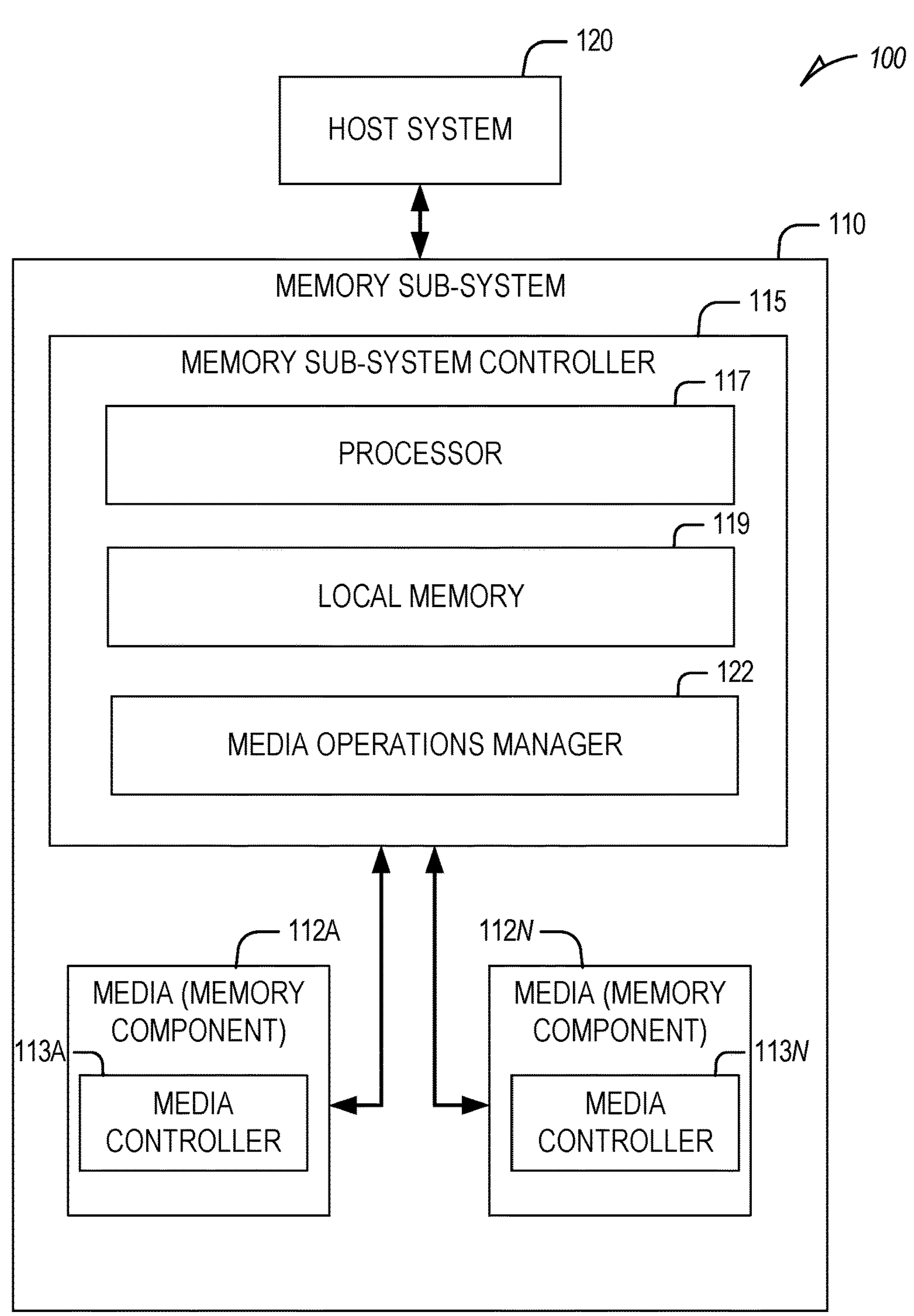
FIG. 1 is a block diagram illustrating an example computing environment including a memory sub-system, in accordance with some embodiments of the present disclosure.

Aspects of the present disclosure configure a system component, such as a memory sub-system controller, to perform different memory management operations on different groups of memory components (e.g., memory dies or blocks) based on forecasted temperature and/or weather conditions at a future time/destination. The memory sub-system controller can access a first temperature associated with an environment to which a host is exposed at a reference time (e.g., the current time). The controller can forecast a second temperature that the host will experience or be exposed to at a future time. The controller can dynamically select an individual media management operation from a plurality of media management operations to perform on the individual group of memory components based on a difference in the first and second temperatures. This enables the controller to dynamically select and tailor different media management operations to the temperature range and difference that a host experiences between when data is written and when the data is later read, which improves the overall efficiency of operating the memory sub-system. Namely, rather than configuring the memory sub-system to be operable reliably across an extremely wide or maximum range of temperatures (which can result in slow or poor performance), the memory sub-system operates according to the actual range of temperatures that are forecasted to which the memory sub-system will be exposed with some specified margin.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written (e.g., refreshed), for example as initiated by the firmware, is hereinafter referred to as "garbage collection data." "User data" can include host data and garbage collection data. "System data" hereinafter refers to data that is created and/or maintained by the memory sub-system for performing operations in response to host requests and for media management. System data can be stored in a boot partition of the memory sub-system. Examples of system data include, and are not limited to, system tables (e.g., logical-to-physical address mapping table), data from logging, scratch pad data, bootup operations or commands, and so forth.

Many different media management operations can be performed on the memory device. For example, the media management operations can include different scan rates, different scan frequencies, different wear leveling, different program speeds, different read disturb management, different data retention periods, different data read trim levels, different near miss error correction (ECC), and/or different dynamic data refresh periods. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered. Data read trim levels define the range of voltages that need to be applied to a given memory cell to read/write data to the given memory cell. Program speeds are usually a function of the voltage that is applied to program a given memory cell. Data retention periods define how long data can be stored in a given memory cell before having to be refreshed. Different temperatures can affect the parameters selected for performing these different media management operations to ensure that the data programmed to the memory sub-system remains reliable and accurate and error free.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. Specifically, certain memory devices, such as NAND flash devices, can be integrated in a host, such as a vehicle or mobile device. The host can be exposed to a wide range of temperatures. The reliability at which data that is programmed to the memory devices can be read reliably (e.g., error free or within a certain error rate) depends on the temperature at which the data was written and the temperature at which the data is read. Current memory systems (e.g., SSD drive or die package systems) associate all of the memory devices in the memory system with a certain reliability specification to ensure the reliability of reading and writing data. The memory systems need to meet the reliability specification to be approved for use and cannot include any particular memory device that fails to meet the reliability specification. The reliability specification usually is set based on worst-case conditions to which the memory devices will possibly be exposed. Namely, the reliability specification can specify that the memory devices need to operate within a very large range of temperatures (e.g., from −40 degrees Celsius to 115 degrees Celsius).

Current memory controllers perform memory management operations on such memory systems on the basis of the temperature range indicated by the reliability specification rather than the actual temperature ranges to which the memory devices are exposed. For example, the memory controllers may be placed or associated with a host, such as a car, that is exposed to a maximum range of 10 degrees Celsius to 70 degrees Celsius, which is far smaller than the range specified by the reliability specification. As a result, an unnecessary amount of memory management operations can end up being performed on memory dies to meet the temperature range of the reliability specification where more efficient operations could have been performed under the actual temperature ranges to which the memory device is exposed. This can adversely impact the overall performance of the memory system. For example, typical memory controllers can perform the same refresh operations across all of the memory dies based on the worst-case temperature range of the memory system. While such refresh operations are suitable for memory dies exposed to extreme temperatures, these refresh operations may not be necessary for memory dies exposed to smaller temperature ranges and can result in performance of refresh operations that are not needed. This waste in memory operations reduces the efficiency, speed and performance of the memory systems. Current memory systems fail to provide a solution that addresses the needs of all memory devices and applications based on their actual environmental conditions or those to which their respective hosts are exposed.

Aspects of the present disclosure address the above and other deficiencies by providing a memory controller that can determine a current temperature (at a current location of the host associated with the memory controller) and a forecasted temperature (e.g., at a future location of the host associated with the memory controller) and tailors the memory operations that are performed on the difference in the current and forecasted temperatures. As a result, the memory controller can tailor the memory management operations to their particular temperature ranges of the memory components without having to sacrifice performance by applying the same memory management operations across all of the memory components. This increases the efficiency of operating memory systems.

For some embodiments, the memory sub-system (e.g., memory sub-system controller) can determine, at a current time, a first temperature of an environment associated with a host (e.g., a vehicle, car, boat, airplane, mobile device, and so forth) of the memory sub-system. The memory sub-system forecasts, at the current time, a second temperature that the host will be exposed to at a future time. The memory sub-system computes, at the current time, a temperature range based on a difference between the first temperature and the second temperature. The memory sub-system selects, for an individual group of memory components of the set of memory components, an individual media management operation from a plurality of media management operations based on the computed temperature range and performs the individual media management operation on the individual group of memory components.

In some examples, the host includes a vehicle. In some examples, the host includes a mobile device.

In some examples, the memory sub-system receives a trip plan from the host. The memory sub-system identifies a destination location of the host at the future time based on the trip plan. The memory sub-system accesses weather information (e.g., via the Internet) associated with the destination location to forecast the second temperature. In some examples, the memory sub-system communicates with a weather server an identification of the destination location and the future time. The memory sub-system receives from the weather server the second temperature that is forecasted for the destination location at the future time.

In some examples, the plurality of media management operations includes at least one of different media scan rates, different refresh rates, different program speeds, different data retention periods, different data read trim levels. In some examples, the individual media management operation that is selected to reduce data loss or errors in data that has been programmed at the current time and will be read or accessed at the future time.

In some examples, the memory sub-system programs data to the individual group of memory components at the current time based on the second temperature that the host will be exposed to at the future time. In some examples, the memory sub-system is powered down at the current time and is booted up at the future time. In some examples, the individual group of memory components corresponds to a boot partition of the memory sub-system.

In some examples, the memory sub-system periodically determines a third temperature at a middle time between the current time and the future time, the third temperature being of the environment to which the host is exposed at the middle time. The memory sub-system determines whether the third temperature falls between the first temperature and the second temperature.

In some examples, the memory sub-system verifies that the forecasted second temperature is accurate based on determining that the third temperature falls between the first temperature and the second temperature. In some examples, the memory sub-system sets a margin around the computed temperature range to select the individual media management operation. In some examples, the memory sub-system accesses a temperature trend representing different temperatures that the host is exposed to after the current time and before the future time and forecasts the second temperature based on the temperature trend.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-systems 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, car, bus, airplane, boat, industrial equipment, or a networked commercial device), a system-on-chip (SoC) device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones. In some cases, different memory management operations can be performed on different groups of memory cells within each memory component 112A to 112N.

The memory sub-system controller 115 can communicate with the memory components 112A to 112N to perform operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different program speeds, different read disturb management, different data retention periods, different data read trim levels, different near miss ECC, and/or different dynamic data refresh periods.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify current and/or future temperatures of an environment to which the host system 120 is exposed currently or at a future time.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to selectively and adaptively perform different memory management operations on the memory components 112A to 112N on the basis of the temperature range to which the host system 120 is exposed at different times. For example, the memory sub-system controller 115 can select the memory management operations to perform on the memory components 112A to 112N or portion thereof based on a difference between a first temperature when data is programmed to the memory components 112A to 112N and a second temperature that is forecasted to exist at a future time when the data will be read from the memory components 112A to 112N. For example, the media operations manager 122 can determine, at a current time, a first temperature of an environment associated with a host (e.g., a vehicle, car, boat, airplane, mobile device, and so forth) of the memory sub-system. The media operations manager 122 forecasts, at the current time, a second temperature that the host will be exposed to at a future time. The media operations manager 122 computes, at the current time, a temperature range based on a difference between the first temperature and the second temperature. The media operations manager 122 selects, for an individual group of memory components of the set of memory components, an individual media management operation from a plurality of media management operations based on the computed temperature range and performs the individual media management operation on the individual group of memory components. In this way, the media operations manager 122 can tailor the type of memory management operation that is performed on different groups of memory components 112A to 112N on the basis of temperature ranges to which the host system 120 is exposed and will be exposed.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
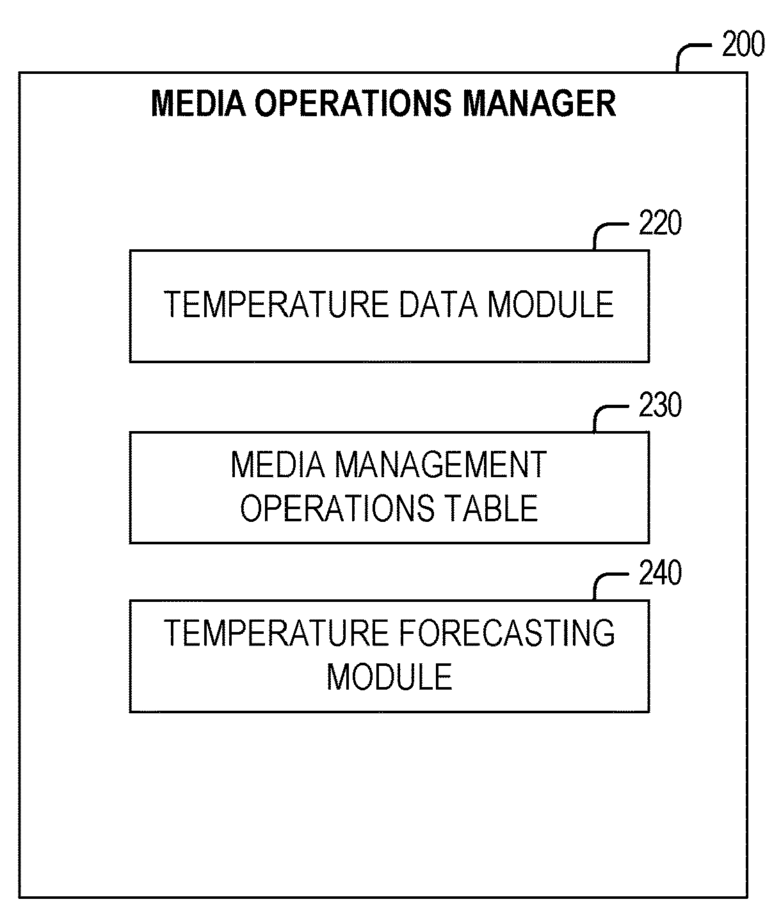
FIG. 2 is a block diagram of an example media operations manager, in accordance with some implementations of the present disclosure.

FIG. 2 is a block diagram of an example media operations manager 200, in accordance with some implementations of the present disclosure. As illustrated, the media operations manager 122 of FIG. 1 includes temperature data module 220, a media management operations table 230, and a temperature forecasting module 240. For some embodiments, the media operations manager 122 can differ in components or arrangement (e.g., less or more components) from what is illustrated in FIG. 2.

The temperature data module 220 communicates with the host system 120 of FIG. 1 to obtain a current temperature of the environment to which the host system 120 is exposed. In some cases, the temperature data module 220 accesses a temperature sensor associated with the memory sub-system 110 of FIG. 1 and reads the current value of the temperature sensor. The current temperature can be stored as a first temperature representing the temperature at which data is programmed to the memory sub-system 110, such as before the memory sub-system 110 is powered down.

The temperature data module 220 can also communicate with the host system 120 to obtain a current trip plan and/or to determine a destination associated with the host system 120. The destination can be received from the host system 120 using global positioning system (GPS) coordinates and/or as a name of a location, city, and/or state. The host system 120 can specify in the trip plan a future time at which the destination will be reached. The temperature data module 220 can provide the current temperature and the destination and/or trip plan to the temperature forecasting module 240. In some cases, the host system 120 provides, as part of the trip plan, information indicating a forecasted temperature at the destination when the host system 120 will reach the destination.

The temperature forecasting module 240 processes the current temperature, forecasted temperature, and/or the identification of the destination and the future time at which the destination will be reached to compute a temperature range for the memory sub-system 110. The temperature range can represent an actual temperature difference or range between the current time and the future time (e.g., when the memory sub-system 110 is powered on). Based on the actual temperature difference or range, the media operations manager 200 can select which media operations to perform on the memory sub-system 110 to maintain data reliability and integrity above a threshold.

In some cases, the temperature forecasting module 240 receives the destination identification and the future time when the destination will be reached. The temperature forecasting module 240 communicates with a weather server this information and requests a forecast for what the weather will be at the destination at the future time. The temperature forecasting module 240 receives, at the current time, from the weather server the forecasted temperature (e.g., the second temperature) that the host system 120 and the memory sub-system 110 will be exposed to at the future time. In some cases, the temperature forecasting module 240 accesses a website of the weather server over the Internet to search for the forecasted temperature. The operations to communicate with the weather server can be performed and if the host system 120 fails to include the forecasted temperature as part of the trip plan or if the host is unable to provide the forecasted temperature when requested by the temperature data module 220.

In some examples, the temperature forecasting module 240 receives a current temperature and does not receive a trip plan or future destination from the host system 120. In such cases, the temperature forecasting module 240 periodically communicates with a temperature sensor of the host system 120 and/or of the memory sub-system 110 to read the current temperature conditions. The temperature forecasting module 240 stores the current temperature conditions in a trend table to compute a temperature trend across a range of time periods. The temperature forecasting module 240 can estimate or predict a forecasted temperature based on the temperature trend, such as by extrapolating the temperature trend to a specified time point in the future, such as one hour from a current time, five hours from the current time, or 24 hours from the current time.

In some examples, the temperature forecasting module 240 continuously or routinely monitors temperatures or temperature trends of an environment to which the host system 120 of the memory components 112A to 112N of FIG. 1 is exposed. The temperature forecasting module 240 can apply one or more machine learning models or heuristics on temperatures. Based on an output of the machine learning models or heuristics, the temperature forecasting module 240 can determine or predict future or forecasted temperatures associated with the memory components 112A to 112N.

In some examples, the temperature forecasting module 240 routinely or periodically determines whether the forecasted temperature is accurate by verifying that a trend associated with a current set of temperatures is approaching the forecasted temperature. For example, the temperature forecasting module 240 can receive the current temperature and can forecast the forecasted temperature. The temperature forecasting module 240 can, every 5 minutes or every hour or other time interval, collect a current temperature reading. The temperature forecasting module 240 can compute a temperature trend based on a collection of temperature readings captured after a first time and before reaching the future time (e.g., the second time). The temperature forecasting module 240 can verify whether the trend of the temperatures is progressing towards the forecasted temperature. If so, the temperature forecasting module 240 determines that the forecasted temperature is accurate. If not, the temperature forecasting module 240 communicates with the host system 120 to determine whether a change has been made to the trip plan and/or to the destination. If the host system 120 indicates that a change has been made, the temperature forecasting module 240 updates the forecasted temperature for the new destination and new arrival time and modifies the memory management operations accordingly, In some examples, the media management operations table 230 stores a table or map that associates different temperature ranges to specific types of memory management operations. For example, a first temperature range can be associated with a first refresh rate and read/write trim voltage levels and a second temperature range can be associated with a second refresh rate and read/write trim voltage levels or different type of memory management operation. The media operations manager 200 can receive the temperature range (computed based on a current temperature and a forecasted temperature) from the temperature forecasting module 240. Based on the temperature range, the media operations manager 200 searches the table 230 to determine the type of memory management operations to perform on one or more memory components 112A to 112N. The media operations manager 200 retrieve the identified memory management operations corresponding to the current temperature range received from the temperature forecasting module 240 and performs (e.g., programs data to the memory components 112A to 112N and/or performs refresh operations on the data stored in the memory components 112A to 112N) according to the identified memory management operations. The media management operation is selected to reduce data loss or errors in data that has been programmed at the current time (e.g., before the memory sub-system 110 is powered down) and will be read or accessed at the future time (e.g., at the end of the trip or when the memory sub-system 110 is booted or powered on).

In some examples, the media operations manager 200 determines using the temperature forecasting module 240 the forecasted temperature that the host system 120 will be exposed to at a future time. The media operations manager 200 can store or program data at a current time using a first set of trim levels and/or associated with a first refresh rate according to the forecasted temperature, even though at the current time, the host system 120 is exposed to a different temperature (which can be higher or lower than the forecasted temperature).

Figure 3:
FIG. 3 is a flow diagram of an example method to selectively perform media management operations based on forecasted temperatures, in accordance with some implementations of the present disclosure.
Figure 3:
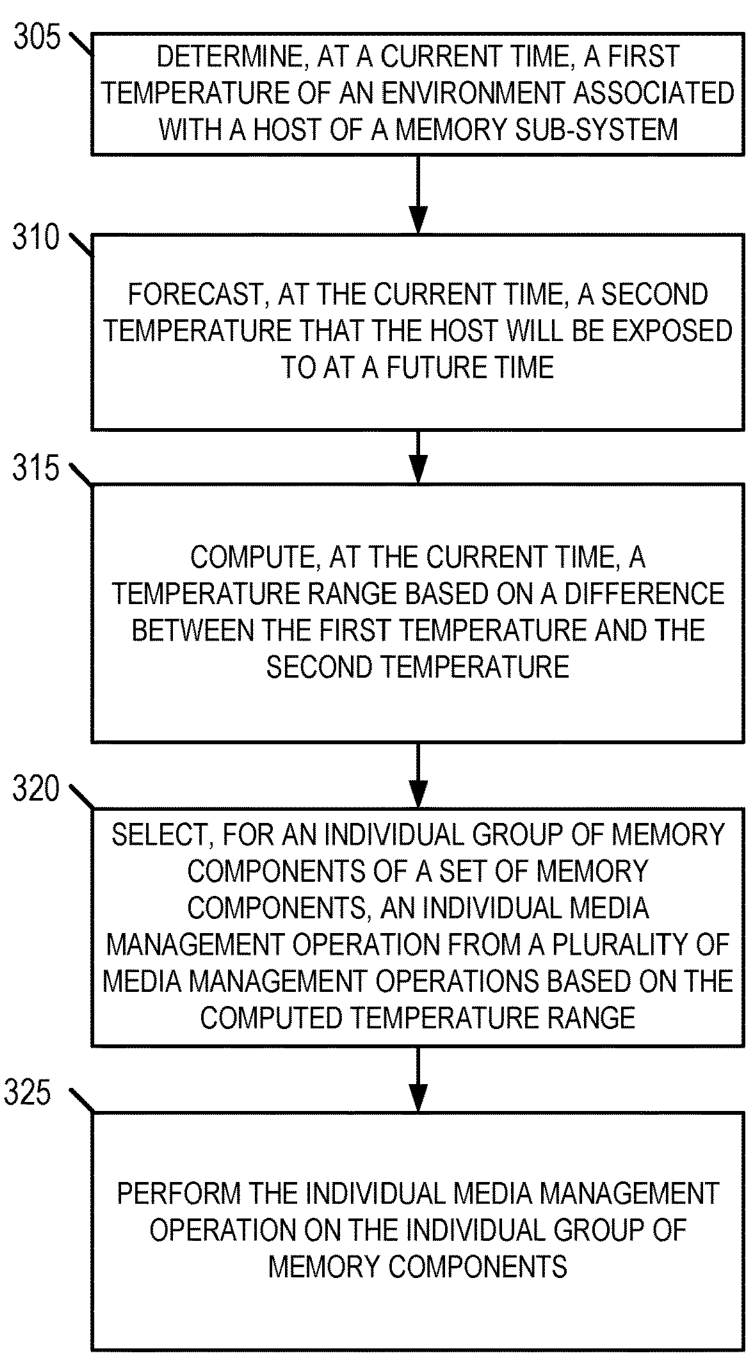

FIG. 3 is a flow diagram of an example method 300 to selectively perform media management operations based on reliability grades, in accordance with some implementations of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 3, the method (or process) 300 begins at operation 305, with a media operations manager 122 of FIG. 1 of a memory sub-system (e.g., memory sub-system 110 of FIG. 1) determining, at a current time, a first temperature of an environment associated with a host of the memory sub-system, such as the memory sub-system controller 115 (FIG. 1), a vehicle or mobile device. For some embodiments, the configuration data is received from a host system (e.g., the host system 120 of FIG. 1) communicatively coupled to the memory sub-system.

At operation 310, the media operations manager 122 of the memory sub-system forecasts, at the current time, a second temperature that the host will be exposed to at a future time. Thereafter, at operation 315, the media operations manager 122 computes, at the current time, a temperature range based on a difference between the first temperature and the second temperature. Then, at operation 320, the media operations manager 122 selects, for an individual group of memory components of the set of memory components, an individual media management operation from a plurality of media management operations based on the computed temperature range. At operation 325, the media operations manager 122 performs the individual media management operation on the individual group of memory components.

Figure 4:
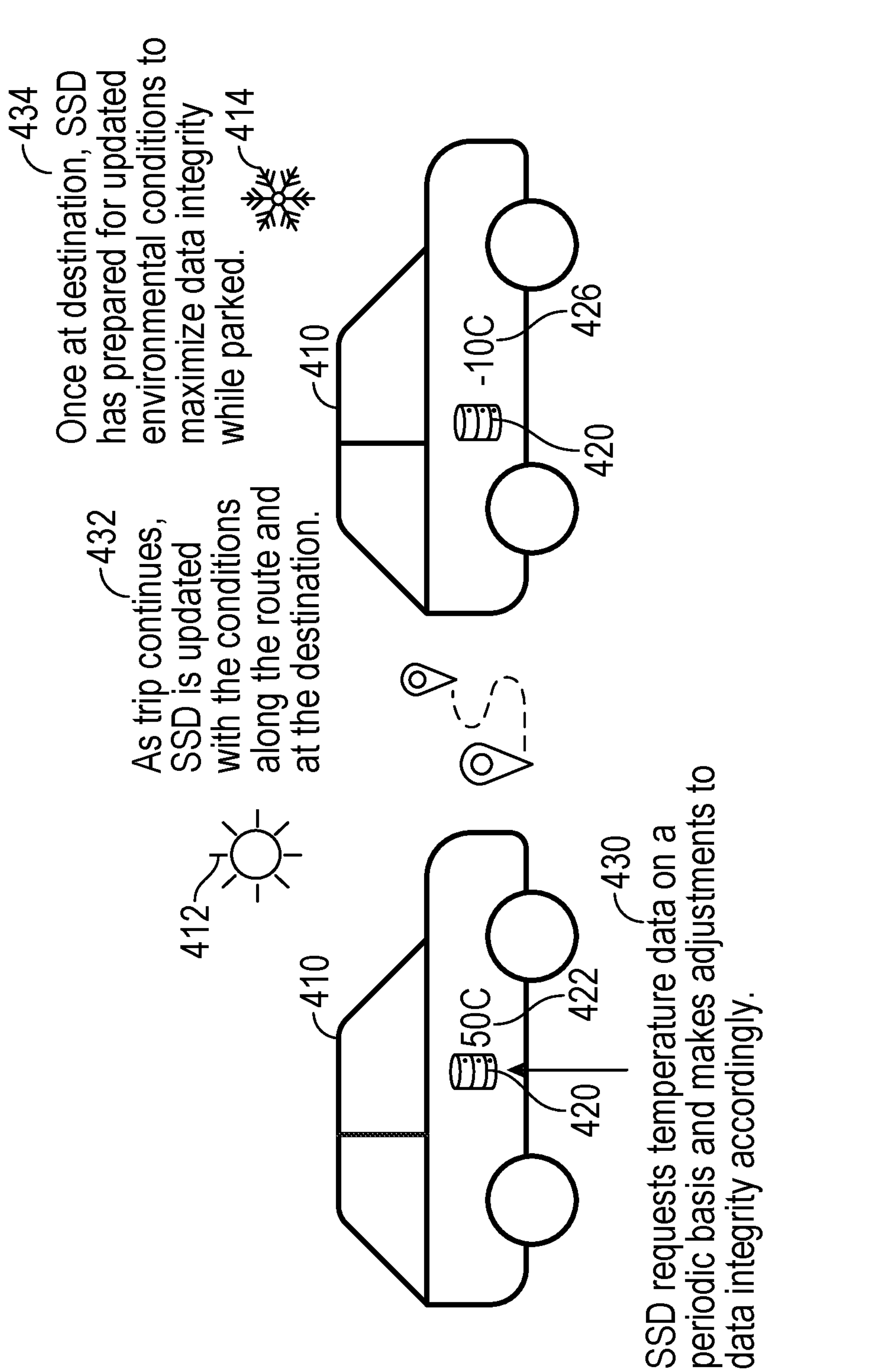
FIG. 4 provides an interaction diagram illustrating interactions between components of the computing environment in the context of some embodiments in which a media operations manager is used.

FIG. 4 provides an interaction diagram 400 illustrating interactions between components of the computing environment in the context of some embodiments in which a media operations manager is used. For example, as shown in FIG. 4, a vehicle 410 (e.g., which corresponds to the host system 120 of FIG. 1) includes a memory device 420. The memory device 420 can correspond to the memory sub-system 110 of FIG. 1 that includes the media operations manager 122. At or during a current or first time, the vehicle 410 can be exposed to an environment 412 associated with a first weather condition (e.g., a first temperature 422, such as 50 degrees Celsius).

At or during the current or first time, the memory device 420 performs operation 430 to request temperature data on a periodic basis to adjust memory management operations to maintain data integrity according to the temperature data. For example, the memory device 420 can determine a forecasted temperature 426 associated with a destination environment 414 of the vehicle 410. The forecasted temperature 426 corresponds to the destination environment 414 of the vehicle 410 at a future time (e.g., second time) which is after the current or first time. The forecasted temperature 426 at the destination environment 414 can correspond to −10 degrees Celsius. The memory device 420 can receive a request to program data from the host system 120. In response, the memory device 420 can perform one or more memory management operations, such as refresh operations and/or trim level settings, to store or program the data from the host system 120 based on the forecasted temperature 426 of the destination environment 414. In some cases, the memory device 420 computes a difference or range between the first temperature 422 and the forecasted temperature 426 and selects the memory management operations to perform based on the difference or range.

The memory device 420 can perform operation 432 as the trip continues between the first time and the second time, the memory device 420 periodically verifies that the weather conditions, such as the temperature, are progressing towards the forecasted temperature 426. Then, at or during the second time, upon reaching the destination environment 414, the memory device 420 can receive a request to read or access the data that was programmed when the host system 120 was in the environment 412 at or during the first time. The memory device 420 performs operation 434 to prepare the data for the updated environmental conditions to improve (e.g., maximize) the data integrity, such as while the vehicle 410 is parked. The memory device 420 can access the data based on the memory management operations that were selected when the data was stored while the host system 120 was in the environment 412.

In view of the disclosure above, various examples are set forth below. It should be noted that one or more features of an example, taken in isolation or combination, should be considered within the disclosure of this application.

Example 1. A system comprising: a set of memory components of a memory sub-system; and a processing device operatively coupled to the set of memory components, the processing device being configured to perform operations comprising: determining, at a reference time, a first temperature of an environment associated with a host of the memory sub-system; forecasting, relative to the reference time, a second temperature that the host will be exposed to at a future time; selecting, for an individual group of memory components of the set of memory components, an individual media management operation from a plurality of media management operations based on the second temperature; and performing, prior to the future time, the individual media management operation on the individual group of memory components.

Example 2. The system of Example 1, wherein the host comprises a vehicle, the operations comprising computing, prior to the future time, a temperature range based on a difference between the first temperature and the second temperature, wherein the individual media management operation is selected based on the temperature range.

Example 3. The system of any one of Examples 1-2, wherein the host comprises a mobile device, and wherein the reference time comprises a current time.

Example 4. The system of any one of Examples 1-3, the operations comprising: receiving a trip plan from the host; identifying a destination location of the host at the future time based on the trip plan; and accessing weather information associated with the destination location to forecast the second temperature.

Example 5. The system of Example 4, the operations comprising: communicating with a weather server an identification of the destination location and the future time; and receiving from the weather server the second temperature that is forecasted for the destination location at the future time.

Example 6. The system of any one of Examples 1-5, wherein the plurality of media management operations comprises at least one of different media scan rates, different refresh rates, different program speeds, different data retention periods, different data read trim levels.

Example 7. The system of any one of Examples 1-6, wherein the individual media management operation that is selected to reduce data loss or errors in data that has been programmed at the reference time and will be read or accessed at the future time.

Example 8. The system of any one of Examples 1-7, the operations comprising programming data to the individual group of memory components at the reference time based on the second temperature that the host will be exposed to at the future time.

Example 9. The system of any one of Examples 1-8, wherein the memory sub-system is powered down at the reference time and is booted up at the future time.

Example 10. The system of Example 9, wherein the individual group of memory components correspond to a boot partition of the memory sub-system.

Example 11. The system of any one of Examples 1-10, the operations comprising: periodically determining a third temperature at a middle time between the reference time and the future time, the third temperature being of the environment to which the host is exposed at the middle time; and determining whether the third temperature falls between the first temperature and the second temperature.

Example 12. The system of clause 11, the operations comprising: verifying that the forecasted second temperature is accurate based on determining that the third temperature falls between the first temperature and the second temperature.

Example 13. The system of any one of Examples 1-12, the operations comprising: setting a margin around the second temperature to select the individual media management operation.

Example 14. The system of any one of Examples 1-13, the operations comprising: accessing a temperature trend representing different temperatures that the host is exposed to after the reference time and before the future time; and forecasting the second temperature based on the temperature trend.

Methods and computer-readable storage medium with instructions for performing any one of the above Examples.

Figure 5:
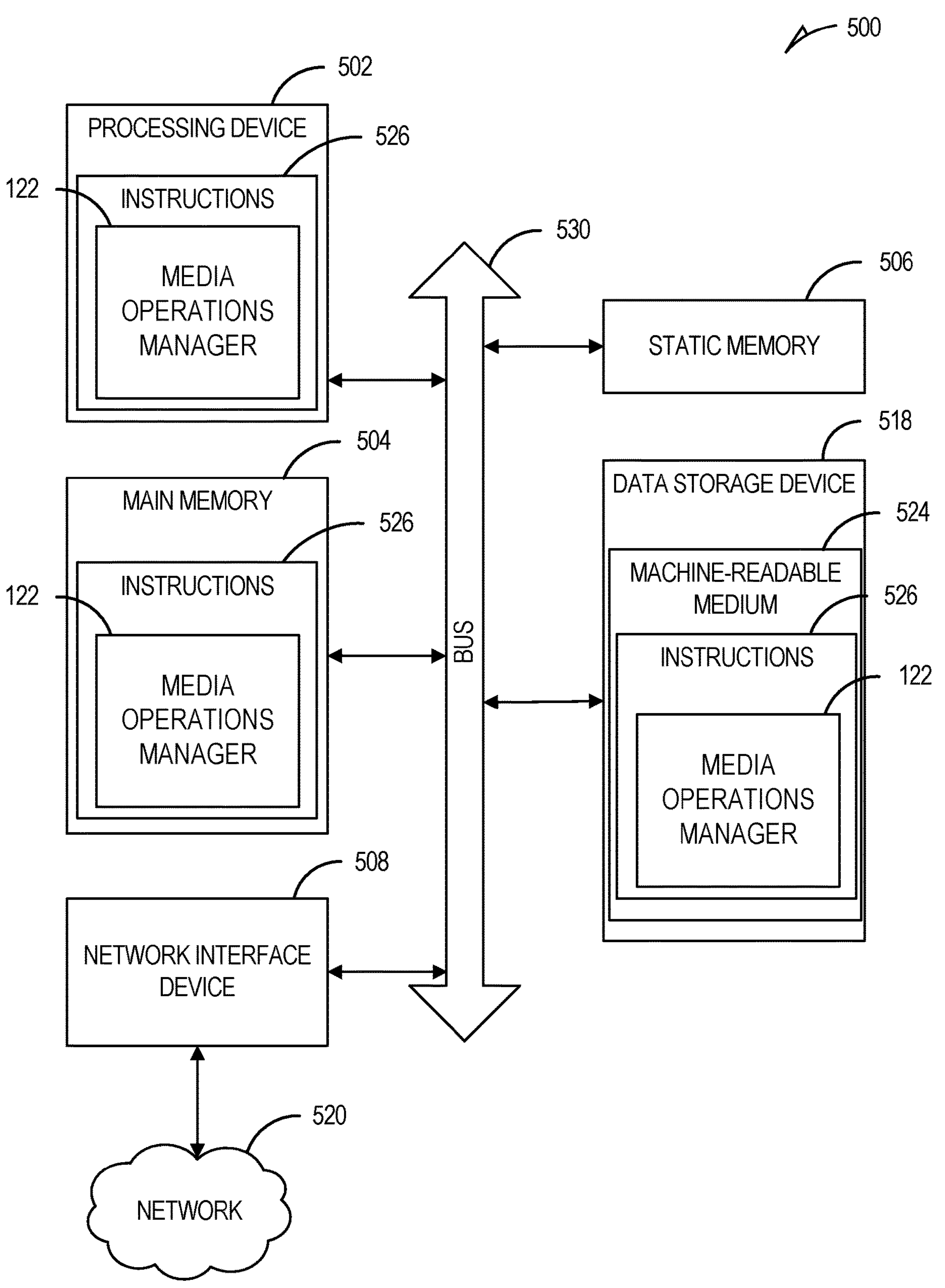
FIG. 5 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 implement functionality corresponding to the media operations manager 122 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a set of memory components of a memory sub-system; and a processing device operatively coupled to the set of memory components, the processing device being programmed to perform operations comprising:

determining, at a reference time, a first temperature based on first weather conditions at a current location associated with a host of the memory sub-system;

communicating, with a host of the memory sub-system, to retrieve second weather conditions of a second location at a future time;

forecasting, relative to the reference time, a second temperature at the future time based on the second weather conditions;

selecting, for an individual group of memory components of the set of memory components, an individual media management operation from a plurality of media management operations based on the second temperature;

performing, prior to the future time, the individual media management operation on the individual group of memory components; and after the individual media management operation is performed at the reference time, powering down the memory sub-system prior to the future time and booting up the memory sub-system at the future time.

2. The system of claim 1, wherein the host comprises a vehicle, the operations comprising computing, prior to the future time, a temperature range based on a difference between the first temperature and the second temperature, wherein the individual media management operation is selected based on the temperature range.

3. The system of claim 1, wherein the host comprises a mobile device, and wherein the reference time comprises a current time.

4. The system of claim 1, the operations comprising:

receiving a trip plan from the host;

identifying a destination location of the host at the future time based on the trip plan; and accessing weather information associated with the destination location to forecast the second temperature.

5. The system of claim 1, wherein the plurality of media management operations comprises at least one of different media scan rates, different refresh rates, different program speeds, different data retention periods, different data read trim levels.

6. The system of claim 1, wherein the individual media management operation that is selected to reduce data loss or errors in data that has been programmed at the reference time and will be read or accessed at the future time.

7. The system of claim 1, the operations comprising programming data to the individual group of memory components at the reference time based on the second temperature that the host will be exposed to at the future time.

8. The system of claim 1, wherein the individual group of memory components correspond to a boot partition of the memory sub-system.

9. The system of claim 1, the operations comprising:
periodically determining a third temperature at a middle time between the reference time and the future time to which the host is exposed at the middle time; and
determining whether the third temperature falls between the first temperature and the second temperature.

10. The system of claim 1, the operations comprising:
setting a margin around the second temperature to select the individual media management operation.

11. The system of claim 1, the operations comprising:
accessing a temperature trend representing different temperatures that the host is exposed to after the reference time and before the future time; and
forecasting the second temperature based on the temperature trend.

12. A method comprising:
determining, at a reference time, a first temperature based on first weather conditions at a current location associated with a host of a memory sub-system;
communicating, with a host of the memory sub-system, to retrieve second weather conditions of a second location at a future time;
forecasting, relative to the reference time, a second temperature at the future time based on the second weather conditions;
selecting, for an individual group of memory components of a set of memory components, an individual media management operation from a plurality of media management operations based on the second temperature;
performing, prior to the future time, the individual media management operation on the individual group of memory components; and
verifying that the forecasted second temperature is accurate based on determining that a third temperature falls between the first temperature and the second temperature.

13. The method of claim 12, wherein the host comprises a vehicle, comprising computing, prior to the future time, a temperature range based on a difference between the first temperature and the second temperature, wherein the individual media management operation is selected based on the temperature range.

14. The method of claim 12, wherein the host comprises a mobile device, and wherein the reference time comprises a current time.

15. The method of claim 12, comprising:
receiving a trip plan from the host;
identifying a destination location of the host at the future time based on the trip plan; and
accessing weather information associated with the destination location to forecast the second temperature.

16. The method of claim 12, comprising:
communicating with a weather server an identification of a destination location and the future time; and
receiving, from the weather server, weather information that is forecasted for the destination location at the future time.

17. A non-transitory computer-readable storage medium comprising instructions that, when executed by a processing device, cause the processing device to perform operations comprising:
determining, at a reference time, a first temperature based on first weather conditions at a current location associated with a host of a memory sub-system;
communicating, with a host of the memory sub-system, to retrieve second weather conditions of a second location at a future time;
communicating with a weather server an identification of a destination location and the future time; and
receiving, from the weather server, weather information that is forecasted for the destination location at the future time;
forecasting, relative to the reference time, a second temperature at the future time based on the second weather conditions and the weather information;
selecting, for an individual group of memory components of a set of memory components, an individual media management operation from a plurality of media management operations based on the second temperature; and
performing, prior to the future time, the individual media management operation on the individual group of memory components.

18. The non-transitory computer-readable storage medium of claim 17, wherein the host comprises a vehicle, comprising computing, prior to the future time, a temperature range based on a difference between the first temperature and the second temperature, wherein the individual media management operation is selected based on the temperature range.

19. The non-transitory computer-readable storage medium of claim 17, wherein the host comprises a mobile device, and wherein the reference time comprises a current time.

20. The non-transitory computer-readable storage medium of claim 17, the operations comprising verifying that the forecasted second temperature is accurate based on determining that a third temperature falls between the first temperature and the second temperature.

* * * * *